United States Patent
Miyazaki et al.

(10) Patent No.: US 11,700,450 B2
(45) Date of Patent: *Jul. 11, 2023

(54) MOTION ANALYSIS DEVICE, MOTION ANALYSIS METHOD FOR IMPROVING MOTIONS OF OPERATOR

(71) Applicant: OMRON Corporation, Kyoto (JP)

(72) Inventors: Masashi Miyazaki, Nara (JP); Hirotaka Wada, Kyoto (JP)

(73) Assignee: OMRON Corporation, Kyoto (JP)

( * ) Notice: Subject to any disclaimer, the term of this patent is extended or adjusted under 35 U.S.C. 154(b) by 234 days.

This patent is subject to a terminal disclaimer.

(21) Appl. No.: 17/070,880

(22) Filed: Oct. 14, 2020

(65) Prior Publication Data
US 2021/0144303 A1    May 13, 2021

(30) Foreign Application Priority Data
Nov. 8, 2019  (JP) .............................. JP2019-203039

(51) Int. Cl.
*H04N 23/68* (2023.01)
*G06F 3/01* (2006.01)

(52) U.S. Cl.
CPC ......... *H04N 23/6812* (2023.01); *G06F 3/011* (2013.01); *G06F 3/017* (2013.01)

(58) Field of Classification Search
CPC ............ H04N 5/23258; H04N 23/6812; G06F 3/011; G06F 3/017; G06V 40/28; G06V 40/23
See application file for complete search history.

(56) References Cited

U.S. PATENT DOCUMENTS

| | | | |
|---|---|---|---|
| 8,560,267 B2 * | 10/2013 | Jangle | G01C 22/006 702/19 |
| 11,380,137 B2 * | 7/2022 | Miyazaki | G06F 3/14 |
| 11,436,770 B2 * | 9/2022 | Miyazaki | G06V 40/28 |
| 2016/0253553 A1 * | 9/2016 | Watanabe | A63B 71/06 700/91 |
| 2018/0189700 A1 * | 7/2018 | Fuke | G06N 20/00 |

FOREIGN PATENT DOCUMENTS

| JP | 2016087420 | * | 5/2016 |
|---|---|---|---|
| JP | 6535778 | | 6/2019 |

* cited by examiner

*Primary Examiner* — Luong T Nguyen
(74) *Attorney, Agent, or Firm* — JCIPRNET

(57) ABSTRACT

A motion analysis device, a motion analysis method and a motion analysis program that make it possible for an operator to improve his or her motions more smoothly are provided. The motion analysis device includes an acquisition part that relates to motions of a plurality of parts of an operator and acquires time-series data relating to an operation performed by an operator and; an analysis part analyzing the time-series data and generating motion data indicating a type of elemental motion and an execution time of the elemental motion from start to end thereof; an evaluation part evaluating the elemental motion performed by the plurality of parts based on an execution timing of the elemental motion; and a display control part performing control to differentiates periods corresponding to different elemental motions and display the evaluation together with the motion data on a display part.

12 Claims, 8 Drawing Sheets

MOTION ANALYSIS DEVICE, MOTION ANALYSIS METHOD FOR IMPROVING MOTIONS OF OPERATOR

CROSS REFERENCE TO RELATED APPLICATIONS

This application claims the priority benefit of Japanese Patent Application No. 2019-203039, filed on Nov. 8, 2019. The entirety of the above-mentioned patent application is hereby incorporated by reference herein and made a part of this specification.

BACKGROUND

Technical Field

The disclosure relates to a motion analysis device, a motion analysis method and a motion analysis program.

Description of Related Art

In the past, motion sensors that measure motion data of operators and techniques of analyzing moving images obtained by photographing situations in which operators move and generating motion data have been used. The motion data may be used for evaluating whether operators are performing proper motions.

For example, the following Patent Document 1 (Japanese Patent No. 6535778) discloses an athletic ability evaluation system that measures a position and/or angle of a subject's body part during physical activities of his or her daily life, calculates athletic ability of the subject's body part in a time-series manner based on measurement results, calculates specific values of athletic ability of at least three body parts out of an upper half of the body, a left lower half of the body, and a right lower half of the body based on the calculated athletic ability of the subject's body part, evaluates the specific values of athletic ability as athletic ability during physical activities of the subject's daily life, and outputs the evaluated values by division into the upper half of the body, the left lower half of the body, and the right lower half of the body.

In Patent Document 1, athletic ability is evaluated by division into a plurality of body parts, but feedback is not given as to what kind of motion is linked to what kind of evaluation. For this reason, an operator is not likely to ascertain what points are good and what points are bad among his or her motions, and thus has difficulty in improving his or her motions.

The disclosure provides a motion analysis device, a motion analysis method and a non-transitory computer-readable recording medium storing motion analysis program that make it possible for an operator to improve his or her motions more smoothly.

SUMMARY

According to one embodiment of the disclosure, a motion analysis device is provided and includes: an acquisition part that relates to motions of a plurality of parts of an operator and acquires time-series data relating to an operation performed by an operator and; an analysis part that analyzes the time-series data and generates motion data indicating a type of elemental motion and an execution time of the elemental motion from a start to an end thereof; an evaluation part that performs an evaluation of the elemental motion performed by the plurality of parts based on a timing of execution of the elemental motion; and a display control part that performs control to differentiate periods corresponding to different elemental motions and display the evaluation together with the motion data on a display part.

According to another embodiment of the disclosure, a motion analysis method is provided and includes: relating to a plurality of parts of an operator and acquiring time-series data relating to an operation performed by the operator; analyzing the time-series data and generating motion data indicating a type and execution time of an elemental motion; performing an evaluation of the elemental motion performed by the plurality of parts based on a timing of execution of the elemental motion; and performing control to display the evaluation together with the motion data on a display part so as to be capable of differentiating periods corresponding to different elemental motions.

According to another embodiment of the disclosure, a non-transitory computer-readable recording medium that stores a motion analysis program is provided. The motion analysis program causes a calculation part included in a motion analysis device to function as: an acquisition part that relates to a plurality of parts of an operator and acquires time-series data relating to an operation performed by the operator; an analysis part that analyzes the time-series data and generates motion data indicating a type and execution time of an elemental motion; an evaluation part that performs an evaluation of the elemental motion performed by the plurality of parts based on a timing of execution of the elemental motion; and a display control part that performs control to display the evaluation together with the motion data on a display part so as to be capable of differentiating periods corresponding to different elemental motions.

DESCRIPTION OF THE EMBODIMENTS

Figure 1:
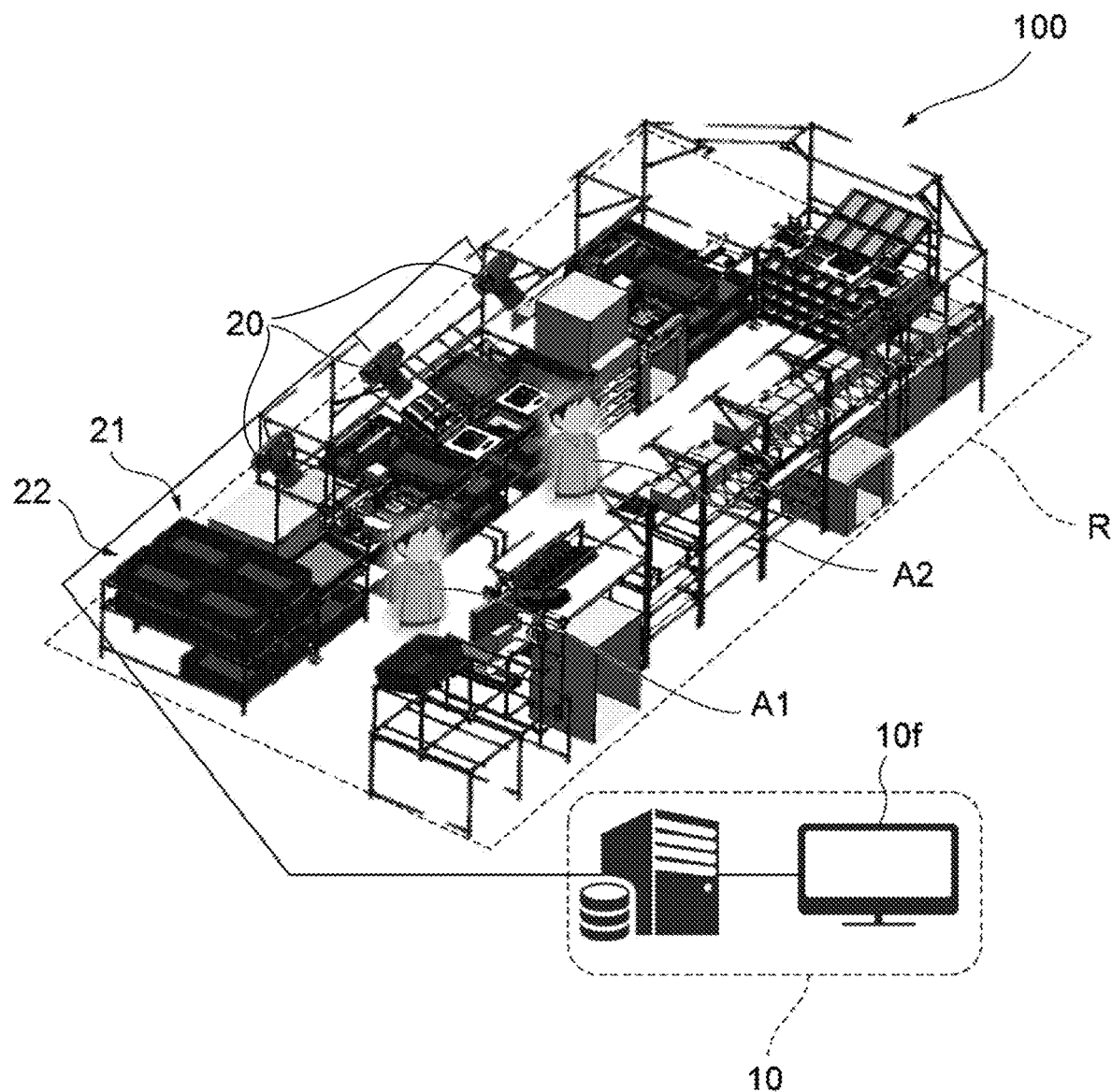
FIG. 1 is a diagram illustrating an outline of a motion analysis system according to an embodiment of the disclosure.

An embodiment of the disclosure will be described with reference to the accompanying drawings. Meanwhile, in each drawing, objects denoted by the same reference numerals and signs have the same or similar configurations.

1. Application Example

First, an example of a situation to which the disclosure is applied will be described with reference to FIG. 1. FIG. 1 is a diagram illustrating an outline of a motion analysis system 100 according to an embodiment of the disclosure. The motion analysis system 100 according to the present embodiment includes a camera 20 that captures a moving image relating to an operator's motion which is executed in a work area R, a photoelectric sensor 21 that detects that the operator's hand enters and leaves a predetermined region, and a pressure sensor 22 that measures pressure applied to a predetermined region. Here, a moving image captured by the camera 20, a signal measured by the photoelectric sensor 21, and a signal measured by the pressure sensor 22 are examples of time-series data of the disclosure. The work area R of this example is a region including the whole manufacturing line, but the work area R may be any region, and may be, for example, a region in which a predetermined process is performed or a region in which a predetermined elemental motion is performed. The elemental motion referred to here is a motion of one unit which is executed by an operator, and includes a motion such as, for example, grasping of parts, transportation of parts, assembly and adjustment of parts, or storage of an assembled product.

In this example, a case where a first operator A1 and a second operator A2 perform operations determined in advance in the work area R will be described. Hereinafter, the first operator A1 and the second operator A2 are referred to as an operator A collectively.

The motion analysis system 100 includes a motion analysis device 10. The motion analysis device 10 acquires time-series data relating to motions of a plurality of parts of the operator A such as a moving image, analyzes the time-series data, and generates motion data indicating the type of elemental motion and the execution time of the elemental motion from the start to the end thereof. The motion analysis device 10 evaluates elemental motions performed by a plurality of parts based on timings of execution of the elemental motions, and performs control to differentiate periods corresponding to different elemental motions and display an evaluation together with the motion data on a display part 10f.

The display part 10f differentiates periods corresponding to different elemental motions and displays an evaluation together with the motion data. In addition, the display part 10f may display a comment indicating an evaluation. Further, the display part 10f may reproduce a moving image relating to a motion of the operator A for each of a plurality of elemental motions.

According to the motion analysis device 10 of the present embodiment, the evaluation of an elemental motion is displayed together with the motion data, so that it is possible to give feedback to an operator as to what kind of elemental motion is linked to what kind of evaluation, and possible for the operator to improve his or her motions more smoothly.

2. Configuration Example

[Functional Configuration]

Figure 2:
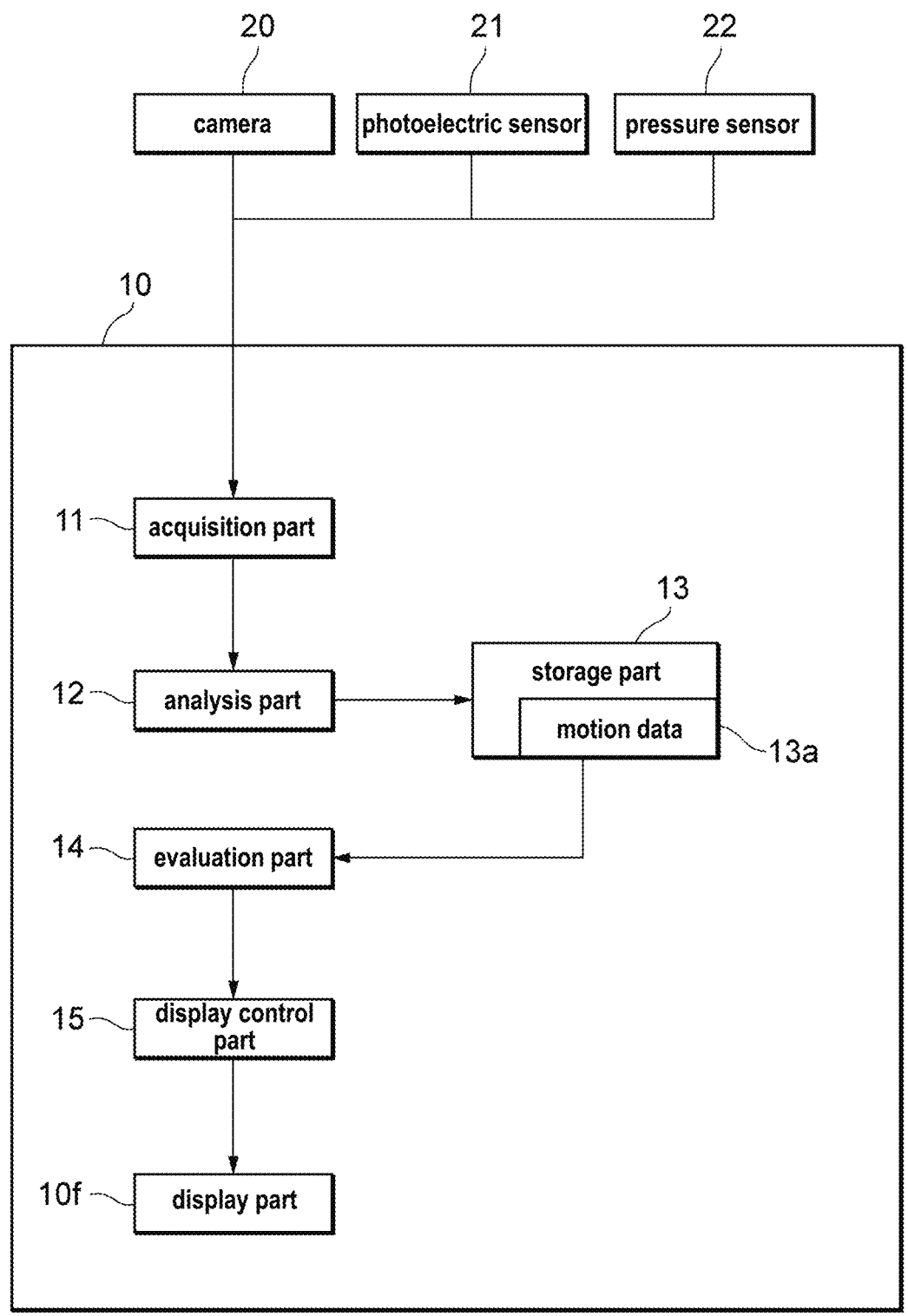
FIG. 2 is a diagram illustrating a functional block of the motion analysis device according to the present embodiment.

FIG. 2 is a diagram illustrating a functional block of the motion analysis device 10 according to the present embodiment. The motion analysis device 10 includes an acquisition part 11, an analysis part 12, a storage part 13, an evaluation part 14, and a display control part 15.

<Acquisition Part>

The acquisition part 11 acquires time-series data relating to motions of a plurality of parts of the operator A with respect to an operation performed by the operator A. The time-series data includes a moving image captured by the camera 20, a signal measured by the photoelectric sensor 21, and a signal measured by the pressure sensor 22.

<Analysis Part>

The analysis part 12 analyzes the time-series data and generates motion data indicating the type of elemental motion and the execution time of the elemental motion from the start to the end thereof. The type of elemental motion is, for example, grasping, transportation, adjustment and storage of parts, but may include other types of motions. In addition, the elemental motion may be arbitrarily set. The start and end of the elemental motion may be represented by a time, or may be represented by an elapsed time from a starting point in time of time-series data.

<Storage Part>

The storage part 13 stores motion data 13a generated by the analysis part 12. The storage part 13 may store time-series data.

<Evaluation Part>

The evaluation part 14 evaluates elemental motions performed by a plurality of parts based on timings of execution of the elemental motions. In a case where time-series data relating to a plurality of parts includes time-series data relating to a left hand and a right hand, the evaluation part 14 may give a high evaluation when the elemental motions are executed in parallel using the left hand and the right hand. In this manner, by giving a high evaluation when the elemental motions can be executed in parallel using the left hand and the right hand, an operator can be motivated to be able to perform an operation in a shorter time.

The evaluation part 14 may give a low evaluation when none of a plurality of parts performs a motion relating to an operation. In this manner, by giving a low evaluation when an operator does not perform a motion relating to an operation, the operator can be motivated to reduce wasted time in the operation.

<Display Control Part>

The display control part 15 performs control to differentiate periods corresponding to different elemental motions and display an evaluation together with the motion data on the display part 10f. Differentiating periods corresponding to different elemental motions includes displaying periods corresponding to different elemental motions in different display modes. Displaying an evaluation together with the motion data includes displaying the motion data in a time-series order and displaying an evaluation to correspond to a timing of execution of an elemental motion indicated by the motion data.

The display control part 15 may perform control to display an icon indicating the evaluation along the motion data on the display part 10f. The icon may visually indicate whether the evaluation is high or low, or may include a round mark indicating a high evaluation and an x mark indicating a low evaluation. In this manner, the evaluation of an elemental motion can be ascertained at a glance with the icon.

The display control part 15 may perform control to display the motion data in different display modes according to the evaluation on the display part 10f. The display control part 15 may, for example, cause motion data corresponding to an elemental motion of a high evaluation to be displayed in blue, and cause motion data corresponding to an elemental motion of a low evaluation to be displayed in red. In this manner, by displaying the motion data in different display modes according to the evaluation, the evaluation of the elemental motion can be ascertained at a glance.

The display control part 15 may perform control to display a comment indicating an evaluation together with the motion data on the display part 10f. The comment may include a high evaluation, a low evaluation, the reason of an evaluation, and advice for improving the evaluation. In this manner, by displaying a comment indicating an evaluation, the details of the evaluation of an elemental motion can be ascertained.

[Hardware Configuration]

Figure 3:
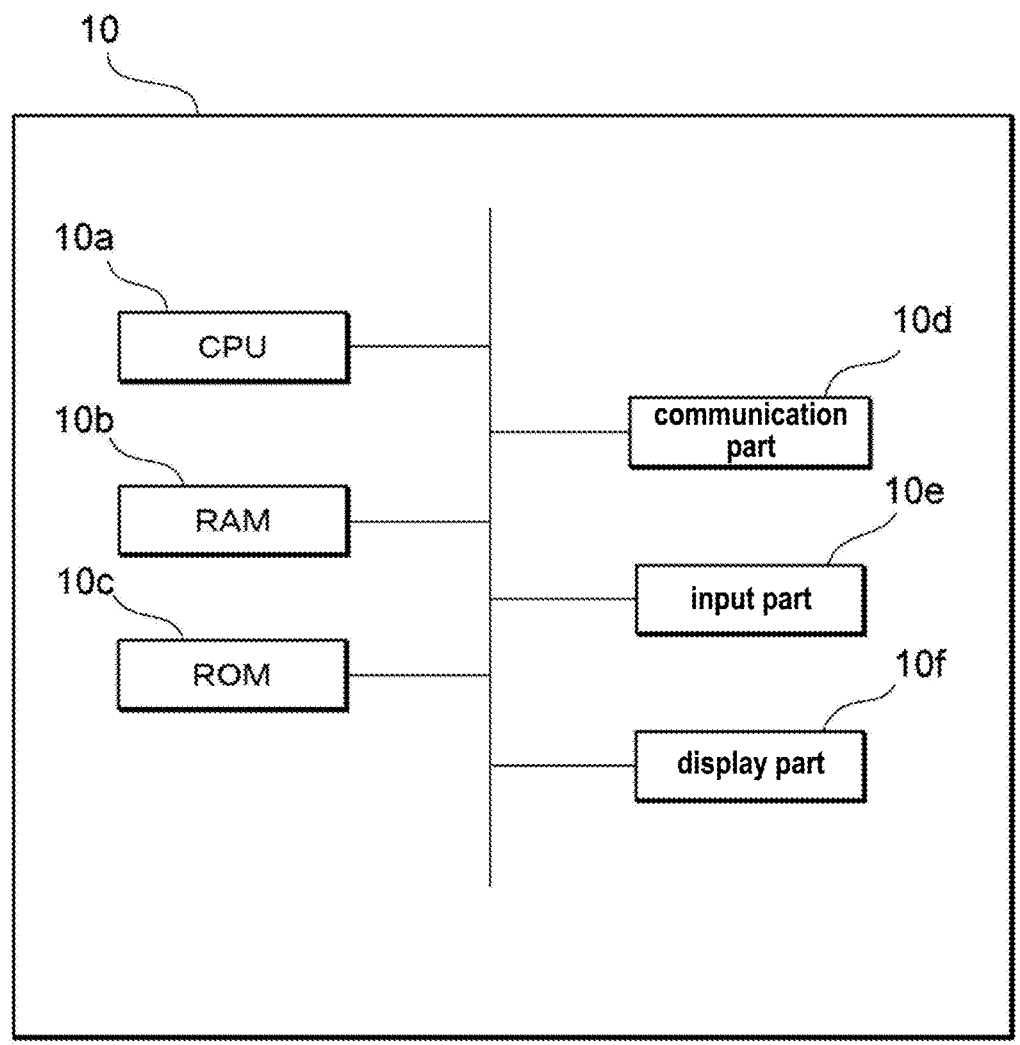
FIG. 3 is a diagram illustrating a physical configuration of the motion analysis device according to the present embodiment.

FIG. 3 is a diagram illustrating a physical configuration of the motion analysis device 10 according to the present embodiment. The motion analysis device 10 includes a central processing unit (CPU) 10a equivalent to a calculation part, a random access memory (RAM) 10b equivalent to the storage part, a read only memory (ROM) 10c equivalent to the storage part, a communication part 10d, an input part 10e, and the display part 10f. These components are connected to each other so as to mutually transmit and receive data through a bus. Meanwhile, in this example, a case where the motion analysis device 10 is constituted by one computer will be described, but the motion analysis device 10 may be realized by a combination of a plurality of computers. In addition, the components shown in FIG. 3 are an example, and the motion analysis device 10 may have components other than these, or may not have some of these components.

The CPU 10a is a control part that performs control relating to the execution of a program stored in the RAM 10b or the ROM 10c or the calculation or processing of data. The CPU 10a is a calculation part that generates motion data by analyzing time-series data relating to an operation performed by the operator and executes a program (motion analysis program) for performing control to display the motion data and its evaluation on the display part. The CPU 10a receives various types of data from the input part 10e or the communication part 10d, and displays results of calculation of data on the display part 10f or stores the results in the RAM 10b.

The RAM 10b is an element that can rewrite data among the storage parts, and may be constituted by, for example, a semiconductor memory element. The RAM 10b may store a program executed by the CPU 10a or data such as motion data. Meanwhile, these are an example, and the RAM 10b may store data other than these, or may not store some of these.

The ROM 10c is an element that can read out data among the storage parts, and may be constituted by, for example, a semiconductor memory element. The ROM 10c may store, for example, a motion analysis program or data which is not rewritten.

The communication part 10d is an interface for connecting the motion analysis device 10 to other instruments. The communication part 10d may be connected to a communication network such as the Internet.

The input part 10e accepts an input of data from a user, and may include, for example, a keyboard and a touch panel.

The display part 10f visually displays the result of calculation performed by the CPU 10a, and may be constituted by, for example, a liquid crystal display (LCD). The display part 10f may display the motion data and its evaluation.

The motion analysis program may be provided by being stored in a computer readable storage medium such as the RAM 10b or the ROM 10c, or may be provided through a communication network which is connected by the communication part 10d. In the motion analysis device 10, various motions described with reference to FIG. 2 are realized by the CPU 10a executing the motion analysis program. Meanwhile, these physical configurations are an example, and may not necessarily be independent of each other. For example, the motion analysis device 10 may include a large-scale integration (LSI) in which the CPU 10a and the RAM 10b or the ROM 10c are integrated with each other.

3. Operation Example

Figure 4:
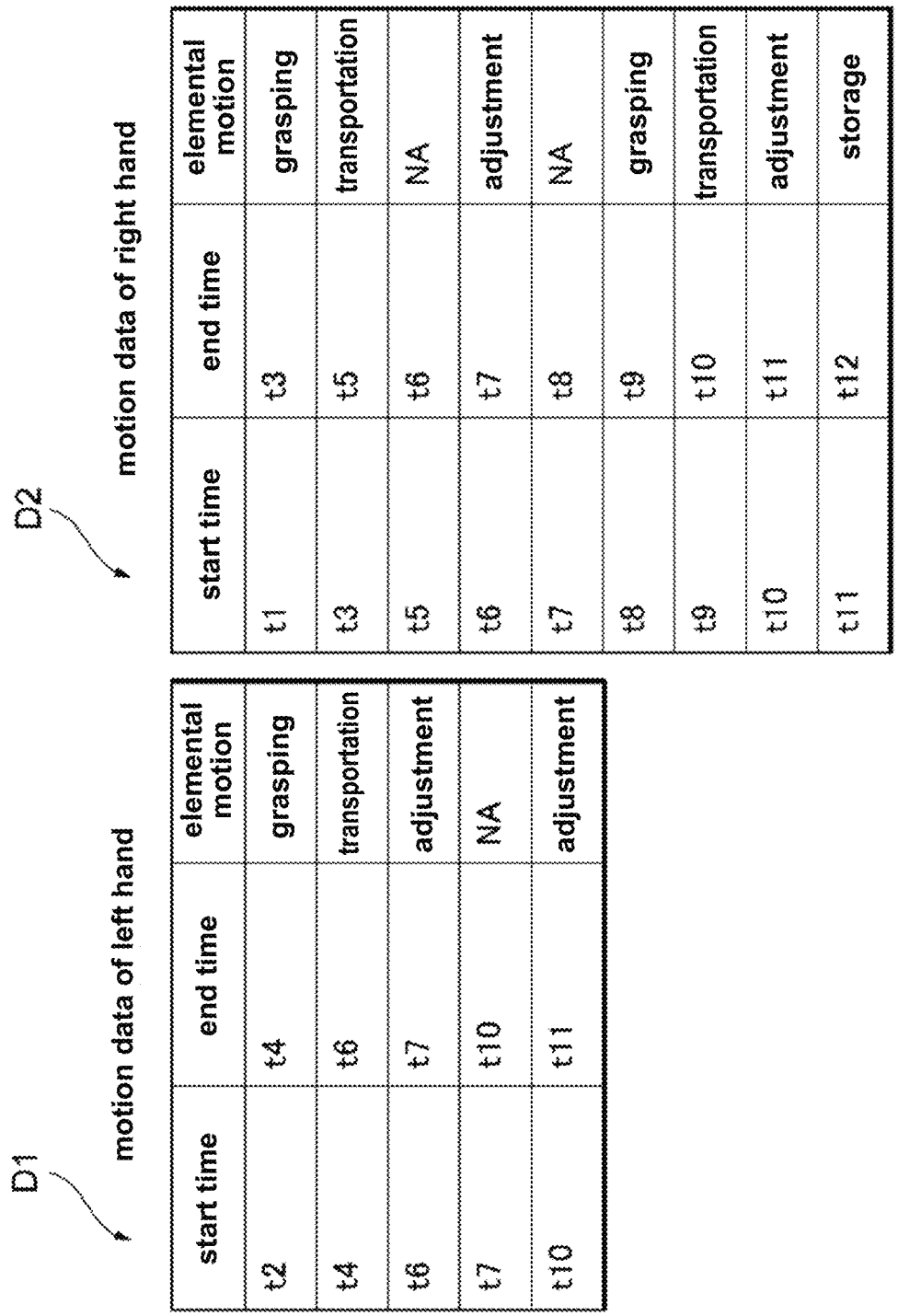
FIG. 4 is a diagram illustrating motion data generated by the motion analysis device according to the present embodiment.

FIG. 4 is a diagram illustrating motion data generated by the motion analysis device 10 according to the present embodiment. The drawing shows each example of motion data D1 of a left hand and motion data D2 of a right hand. Letters of t1 to t12 described in the drawing indicate times arranged in a time-series order.

The motion data D1 of the left hand and the motion data D2 of the right hand include a column of "elemental motions" indicating the types of elemental motions, a column of "start times" indicating the start times of elemental motions, and a column of "end times" indicating the end times of elemental motions.

For example, in the motion data D1 of the left hand, an "elemental motion" having a start time of "t2" and an end time of "t4" is "grasping." In addition, in the motion data D2 of the right hand, an "elemental motion" having a start time of "t1" and an end time of "t3" is "grasping." In this case, it is indicated that a motion of grasping is started with the right hand, a motion of grasping is then started with the left hand, grasping with the right hand is ended, and grasping with the left hand is ended.

In addition, in the motion data D2 of the right hand, it is indicated that an "elemental motion" having a start time of "t7" and an end time of "t8" is "NA" and that a motion relating to an operation is not performed. Meanwhile, an "elemental motion" of "NA" involves the operator A having stopped or a motion irrelevant to a predetermined elemental motion being performed.

Figure 5:
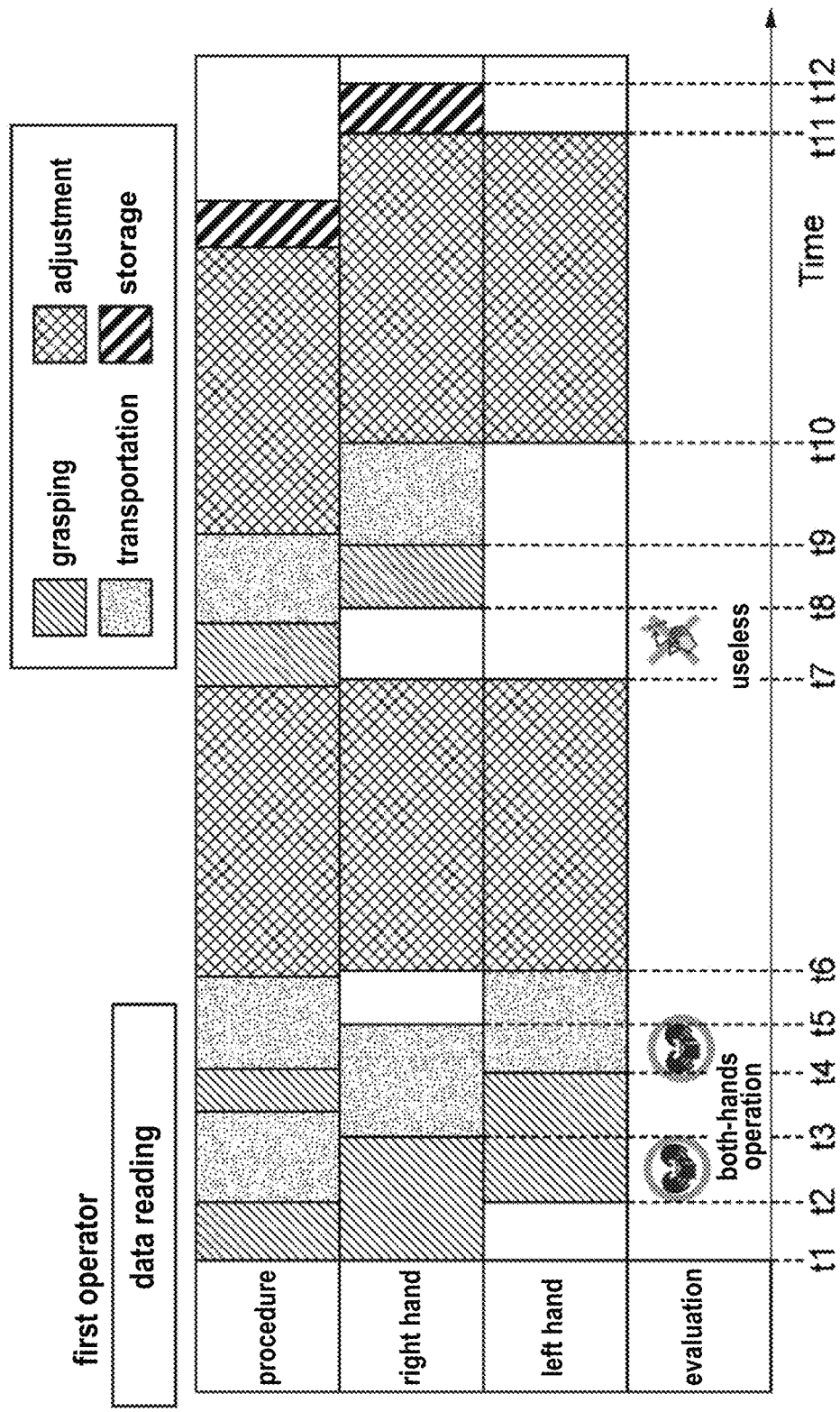
FIG. 5 is a diagram illustrating an example of a screen which is controlled to be displayed by the motion analysis device according to the present embodiment.

FIG. 5 is a diagram illustrating an example of a screen which is controlled to be displayed by the motion analysis device 10 according to the present embodiment. This example is an example in which the motion data D1 of the left hand and the motion data D2 of the right hand shown in FIG. 4 are evaluated by the motion analysis device 10, and the evaluations and motion data are displayed together.

For example, it is displayed by a graph indicating grasping that a motion of grasping is performed with the right hand from time t1 to time t3 and a motion of grasping is performed with the left hand from time t2 to time t4. Here, from time t2 to time t3, grasping is executed in parallel using the right hand and the left hand. The motion analysis device 10 detects that the elemental motion of grasping is executed in parallel using the right hand and the left hand, and gives a high evaluation to the motion. A comment of "both-hand operation," an icon of a round mark, and an icon indicating the both-hand operation are displayed in correspondence with such a high evaluation. Such icons are also displayed from time t4 to time t5. From time t4 to time t5, the elemental motion of transportation is executed in parallel using the right hand and the left hand.

On the other hand, from time t7 to time t8, neither the right hand nor the left hand performs a motion relating to an operation. In other words, motion data from time t7 to time t8 is NA for both the right hand and the left hand. The motion analysis device 10 gives a low evaluation when neither the right hand nor the left hand performs a motion relating to an operation. A comment of "useless," an icon of an x mark, and an icon indicating hand wandering are displayed in correspondence with such a low evaluation.

Figure 6:
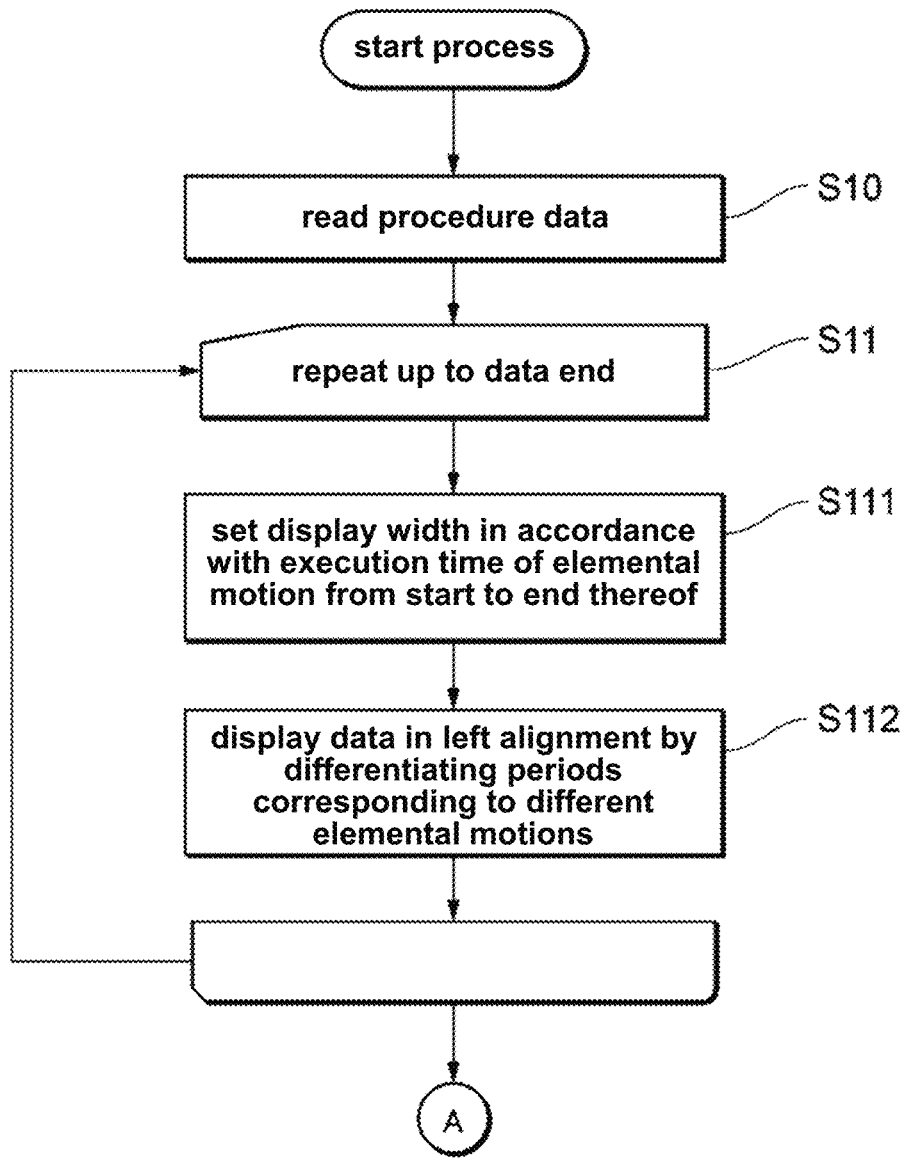
FIG. 6 is a flow chart of a first example of a display control process which is executed by the motion analysis device according to the present embodiment.

FIG. 6 is a flow chart of a first example of a display control process which is executed by the motion analysis device 10 according to the present embodiment. The first example of the display control process is an example of a process of performing control to display motion data on the display part 10f.

First, the motion analysis device 10 reads procedure data from the storage part 13 (S10). The procedure data referred to here is motion data indicating an ideal procedure relating to an operation of the operator A. The procedure data may be read from the storage part 13, or may be read from an external storage device.

Next, the motion analysis device 10 repeatedly executes the following processes S111 and S112 up to the end of the procedure data (S11). The motion analysis device 10 sets a display width in accordance with the execution time of an elemental motion from the start to the end thereof (S111), and differentiates periods corresponding to different elemental motions and displays data in left alignment (S112).

By executing the first example of the display control process, the procedure data is displayed on the display part 10f in a time-series order with widths according to the execution time.

Figure 7:
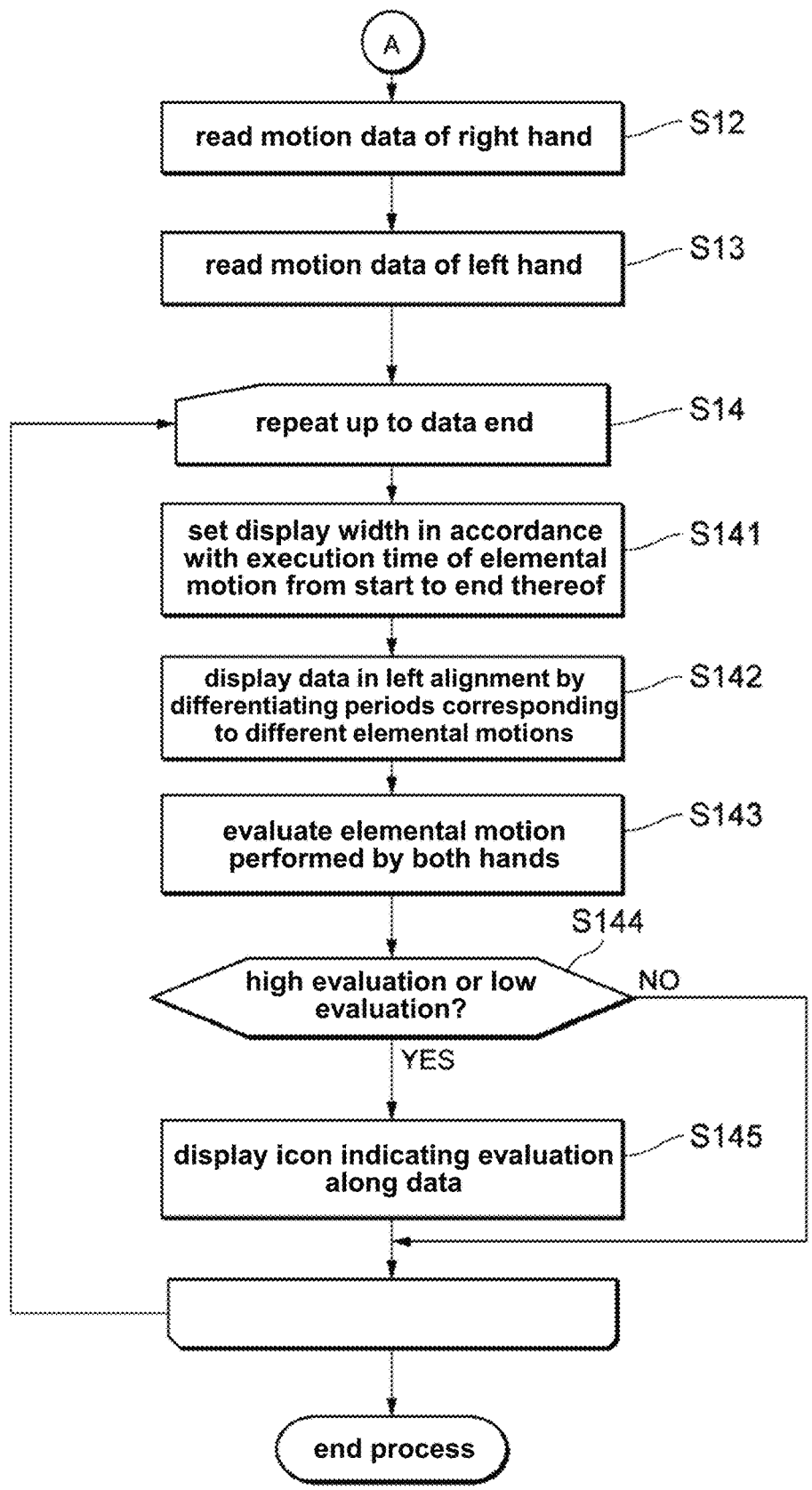
FIG. 7 is a flow chart of a second example of the display control process which is executed by the motion analysis device according to the present embodiment.

FIG. 7 is a flow chart of a second example of the display control process which is executed by the motion analysis device 10 according to the present embodiment. The second example of the display control process is an example of a process which is executed after the first example of the display control process and a process of performing control to display the evaluation of an elemental motion together with the motion data.

The motion analysis device 10 reads motion data of the right hand (S12), and reads motion data of the left hand (S13). Meanwhile, it is natural that, in the order of reading the motion data of the right hand and the motion data of the left hand, either can be read first.

Next, the motion analysis device 10 repeatedly executes the following processes S141 to S145 up to the end of the motion data (S14). The motion analysis device 10 sets a display width in accordance with the execution time of an elemental motion from the start to the end thereof (S141), and differentiates periods corresponding to different elemental motions and displays data in left alignment (S142).

The motion analysis device 10 evaluates an elemental motion performed by both hands (S143), and in a case where the evaluation of the elemental motion is a high evaluation or a low evaluation (S144: YES), the motion analysis device displays an icon indicating the evaluation along data (S145). On the other hand, in a case where the evaluation of the elemental motion is not a high evaluation or a low evaluation (S144: NO), the motion analysis device 10 executes the next process without displaying an icon.

By executing the second example of the display control process, the motion data of the right hand and the left hand is displayed on the display part 10f in a time-series order with widths according to the execution time, and an icon indicating the evaluation is displayed together with the motion data on the display part 10f.

Figure 8:
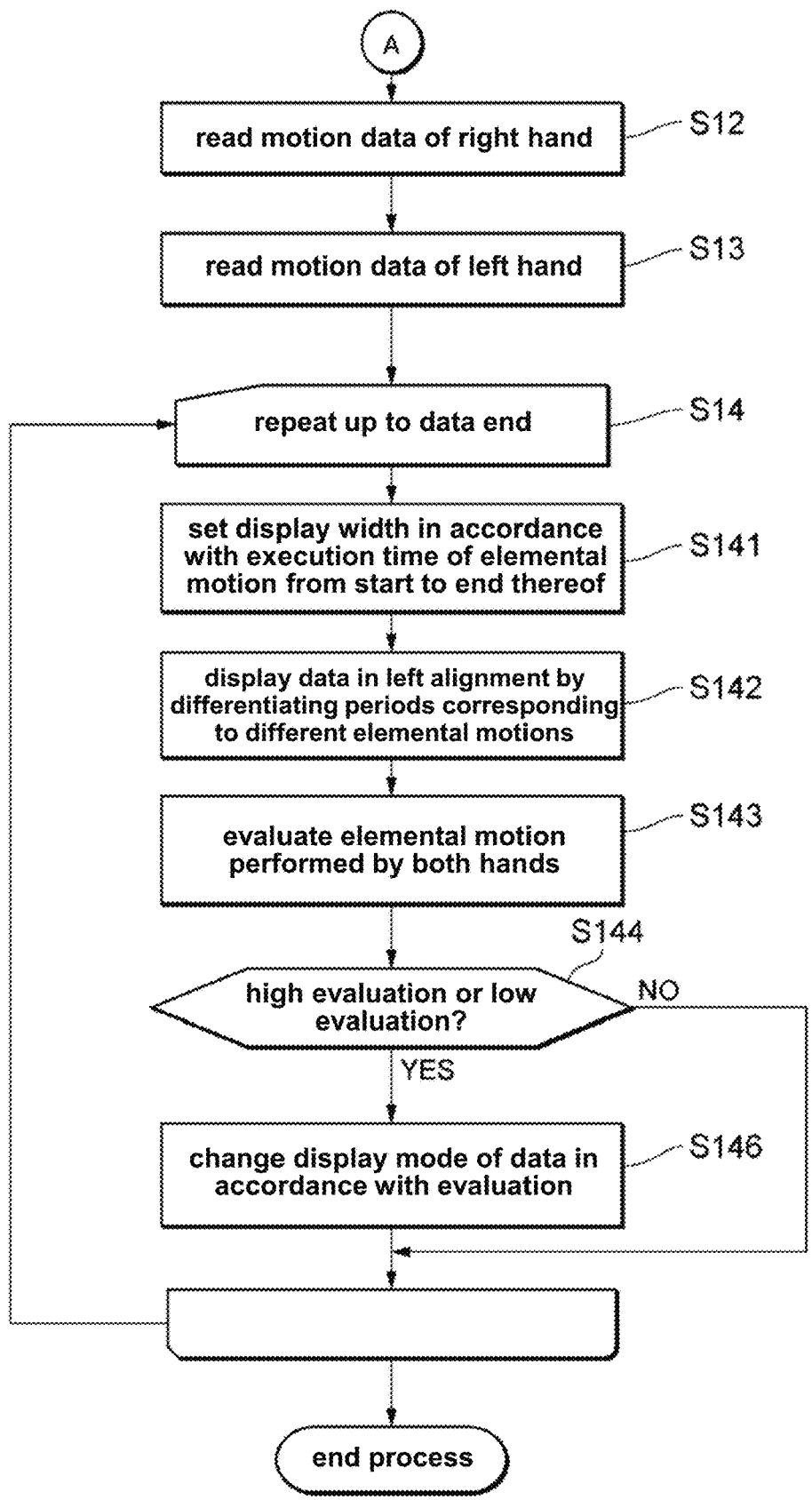
FIG. 8 is a flow chart of a third example of the display control process which is executed by the motion analysis device according to the present embodiment.

FIG. 8 is a flow chart of a third example of the display control process which is executed by the motion analysis device 10 according to the present embodiment. The third example of the display control process is an example of a process which is executed after the first example of the display control process and a process of performing control to change the display mode of motion data in accordance with the evaluation of an elemental motion.

The motion analysis device 10 reads the motion data of the right hand (S12), and reads the motion data of the left hand (S13). Meanwhile, it is natural that, in the order of reading the motion data of the right hand and the motion data of the left hand, either can be read first.

Next, the motion analysis device 10 repeatedly executes the following processes S141 to S145 up to the end of the motion data (S14). The motion analysis device 10 sets a display width in accordance with the execution time of an elemental motion from the start to the end thereof (S141), and differentiates periods corresponding to different elemental motions and displays data in left alignment (S142).

The motion analysis device 10 evaluates an elemental motion performed by both hands (S143), and in a case where the evaluation of the elemental motion is a high evaluation or a low evaluation (S144: YES), the motion analysis device displays an icon indicating the evaluation along data (S146). On the other hand, in a case where the evaluation of the elemental motion is not a high evaluation or a low evaluation (S144: NO), the motion analysis device 10 executes the next process without displaying an icon.

By executing the third example of the display control process, the motion data of the right hand and the left hand is displayed on the display part 10f in a time-series order with widths according to the execution time, and the motion data is displayed on the display part 10f in a display mode according to the evaluation of the elemental motion.

Embodiments of the disclosure may also be described as in the following additions. However, the embodiments of the disclosure are not limited to forms described in the following additions. In addition, the embodiments of the disclosure may be forms obtained by replacing or combining the descriptions between the additions.

[Addition 1]

A motion analysis device (10) comprising:

an acquisition part (11) that acquires time-series data relating to an operation performed by an operator and relating to motions of a plurality of parts of the operator;

an analysis part (12) that analyzes the time-series data and generates motion data indicating a type of elemental motion and an execution time of the elemental motion from a start to an end thereof;

an evaluation part (14) that evaluates the elemental motion performed by the plurality of parts based on a timing of execution of the elemental motion; and a display control part (15) that performs control to differentiates periods corresponding to different elemental motions and display the evaluation together with the motion data on a display part.

[Addition 2]

The motion analysis device (10) according to addition 1, wherein the time-series data relating to the plurality of parts includes time-series data relating to a left hand and a right hand, and the evaluation part (14) gives a high evaluation in a case where the elemental motion is executed in parallel using the left hand and the right hand.

[Addition 3]

The motion analysis device (10) according to addition 1 or 2, wherein the evaluation part (14) gives a low evaluation in a case where none of the plurality of parts performs a motion relating to the operation.

[Addition 4]

The motion analysis device (10) according to any one of additions 1 to 3, wherein the display control part (15) performs control to display an icon indicating the evaluation along the motion data on the display part.

[Addition 5]

The motion analysis device (10) according to any one of additions 1 to 3, wherein the display control part (15) performs control to display the motion data in different display modes according to the evaluation on the display part.

[Addition 6]

The motion analysis device (10) according to any one of additions 1 to 5, wherein the display control part (15) performs control to display a comment indicating the evaluation together with the motion data on the display part.

[Addition 7]

A motion analysis method comprising:

acquiring time-series data relating to an operation performed by an operator and relating to a plurality of parts of the operator;

analyzing the time-series data and generating motion data indicating a type and execution time of an elemental motion;

evaluating the elemental motion performed by the plurality of parts based on a timing of execution of the elemental motion; and performing control to display the evaluation together with the motion data on a display part so as to be capable of differentiating periods corresponding to different elemental motions.

[Addition 8]

A motion analysis program causing a calculation part included in a motion analysis device (10) to function as:

an acquisition part (11) that acquires time-series data relating to an operation performed by an operator and relating to a plurality of parts of the operator;

an analysis part (12) that analyzes the time-series data and generates motion data indicating a type and execution time of an elemental motion;

an evaluation part (14) that evaluates the elemental motion performed by the plurality of parts based on a timing of execution of the elemental motion; and a display control part (15) that performs control to display the evaluation together with the motion data on a display part so as to be capable of differentiating periods corresponding to different elemental motions.

Other Configurations

According to one embodiment of the disclosure, a motion analysis device is provided and includes: an acquisition part that relates to motions of a plurality of parts of an operator and acquires time-series data relating to an operation performed by an operator and; an analysis part that analyzes the time-series data and generates motion data indicating a type of elemental motion and an execution time of the elemental motion from a start to an end thereof; an evaluation part that performs an evaluation of the elemental motion performed by the plurality of parts based on a timing of execution of the elemental motion; and a display control part that performs control to differentiate periods corresponding to different elemental motions and display the evaluation together with the motion data on a display part.

According to this configuration, the evaluation of the elemental motion is displayed together with the motion data, so that it is possible to give feedback to the operator as to what kind of elemental motion is linked to what kind of evaluation, and possible for the operator to improve his or her motions more smoothly.

In one embodiment, the time-series data relating to the plurality of parts may include time-series data relating to a left hand and a right hand, and the evaluation part may give a high evaluation in a case where the elemental motion is executed in parallel using the left hand and the right hand.

According to this configuration, by giving a high evaluation when the elemental motions can be executed in parallel using the left hand and the right hand, an operator can be motivated to be able to perform an operation in a shorter time.

In one embodiment, the evaluation part may give a low evaluation in a case where none of the plurality of parts performs a motion relating to the operation.

According to this configuration, by giving a low evaluation when an operator does not perform a motion relating to an operation, the operator can be motivated to reduce wasted time in the operation.

In one embodiment, the display control part may perform control to display an icon indicating the evaluation along the motion data on the display part.

According to this configuration, the evaluation of an elemental motion can be ascertained at a glance with the icon.

In one embodiment, the display control part may perform control to display the motion data in different display modes according to the evaluation on the display part.

According to this configuration, by displaying the motion data in different display modes according to the evaluation, the evaluation of the elemental motion can be ascertained at a glance.

In one embodiment, the display control part may perform control to display a comment indicating the evaluation together with the motion data on the display part.

According to this configuration, by displaying a comment indicating an evaluation, the details of the evaluation of an elemental motion can be ascertained.

According to another embodiment of the disclosure, a motion analysis method is provided and includes: relating to a plurality of parts of an operator and acquiring time-series data relating to an operation performed by the operator; analyzing the time-series data and generating motion data indicating a type and execution time of an elemental motion; performing an evaluation of the elemental motion performed by the plurality of parts based on a timing of execution of the elemental motion; and performing control to display the evaluation together with the motion data on a display part so as to be capable of differentiating periods corresponding to different elemental motions.

According to this configuration, it is possible to give feedback to the operator as to what kind of elemental motion is linked to what kind of evaluation, and possible for the operator to improve his or her motions more smoothly.

According to another embodiment of the disclosure, a non-transitory computer-readable recording medium that stores a motion analysis program is provided. The motion analysis program causes a calculation part included in a motion analysis device to function as: an acquisition part that relates to a plurality of parts of an operator and acquires time-series data relating to an operation performed by the operator; an analysis part that analyzes the time-series data and generates motion data indicating a type and execution time of an elemental motion; an evaluation part that performs an evaluation of the elemental motion performed by the plurality of parts based on a timing of execution of the elemental motion; and a display control part that performs control to display the evaluation together with the motion data on a display part so as to be capable of differentiating periods corresponding to different elemental motions.

According to this configuration, it is possible to give feedback to the operator as to what kind of elemental motion is linked to what kind of evaluation, and possible for the operator to improve his or her motions more smoothly.

According to the disclosure, it is possible to provide a motion analysis device, a motion analysis method and a non-transitory computer-readable recording medium that stores a motion analysis program that make it possible for an operator to improve his or her motions more smoothly.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A motion analysis device comprising a processor configured to:
   relate to an operation performed by an operator and acquire time-series data relating to motions of a plurality of parts of the operator;
   analyze the time-series data and generate motion data indicating a type of elemental motion and an execution time of the elemental motion from a start to an end thereof;
   evaluate the elemental motion performed by the plurality of parts based on a timing of execution of the elemental motion; and
   control to differentiate periods corresponding to different elemental motions and display an evaluation together with the motion data on a display part.

2. The motion analysis device according to claim 1, wherein the time-series data relating to the plurality of parts includes time-series data relating to a left hand and a right hand, and
   the processor gives a high evaluation in a case where the elemental motion is executed in parallel using the left hand and the right hand.

3. The motion analysis device according to claim 1, wherein the processor gives a low evaluation in a case where none of the plurality of parts performs a motion relating to the operation.

4. The motion analysis device according to claim 2, wherein the processor gives a low evaluation in a case where none of the plurality of parts performs a motion relating to the operation.

5. The motion analysis device according to claim 1, wherein the processor performs control to display an icon indicating the evaluation along the motion data on the display part.

6. The motion analysis device according to claim 2, wherein the processor performs control to display an icon indicating the evaluation along the motion data on the display part.

7. The motion analysis device according to claim 1, wherein the processor performs control to display the motion data in different display modes according to the evaluation on the display part.

8. The motion analysis device according to claim 2, wherein the processor performs control to display the motion data in different display modes according to the evaluation on the display part.

9. The motion analysis device according to claim 1, wherein the processor performs control to display a comment indicating the evaluation together with the motion data on the display part.

10. The motion analysis device according to claim 2, wherein the processor performs control to display a comment indicating the evaluation together with the motion data on the display part.

11. A motion analysis method comprising:
    relating to a plurality of parts of an operator, and acquiring time-series data relating to an operation performed by the operator and;
    analyzing the time-series data and generating motion data indicating a type and an execution time of an elemental motion;
    providing an evaluation of the elemental motion performed by the plurality of parts based on a timing of execution of the elemental motion; and
    performing control to display the evaluation together with the motion data on a display part so as to be capable of differentiating periods corresponding to different elemental motions.

12. A non-transitory computer-readable recording medium that stores a motion analysis program causing a processor included in a motion analysis device to execute:
    relating to a plurality of parts of an operator and acquiring time-series data relating to an operation performed by an operator;
    analyzing the time-series data and generating motion data indicating a type and an execution time of an elemental motion;
    performing an evaluation of the elemental motion performed by the plurality of parts based on a timing of execution of the elemental motion; and
    performing control to display the evaluation together with the motion data on a display part so as to be capable of differentiating periods corresponding to different elemental motions.

* * * * *